US008095394B2

(12) United States Patent
Nowak et al.

(10) Patent No.: US 8,095,394 B2
(45) Date of Patent: Jan. 10, 2012

(54) RICH CLAIM REPORTING SYSTEM

(75) Inventors: Vikki Nowak, Cleveland Hts, OH (US); Brian Brylinksi, Cumming, GA (US)

(73) Assignee: Progressive Casualty Insurance Company, Mayfield Village, OH (US)

( * ) Notice: Subject to any disclaimer, the term of this patent is extended or adjusted under 35 U.S.C. 154(b) by 1123 days.

(21) Appl. No.: 11/803,932

(22) Filed: May 16, 2007

(65) Prior Publication Data

US 2008/0052134 A1  Feb. 28, 2008

Related U.S. Application Data

(60) Provisional application No. 60/801,462, filed on May 18, 2006.

(51) Int. Cl.
| | | |
|---|---|---|
| G06Q 40/00 | (2006.01) | |
| G06Q 10/00 | (2006.01) | |
| G06Q 30/00 | (2006.01) | |
| G06F 17/60 | (2006.01) | |
| G06F 19/00 | (2011.01) | |
| G06F 17/21 | (2006.01) | |
| G06F 15/16 | (2006.01) | |
| G05B 17/00 | (2006.01) | |
| G01C 21/00 | (2006.01) | |
| H04N 7/173 | (2011.01) | |
| H04N 13/04 | (2006.01) | |
| G09G 3/34 | (2006.01) | |
| G09G 5/00 | (2006.01) | |
| G03F 3/08 | (2006.01) | |
| G06N 5/02 | (2006.01) | |
| G01S 13/00 | (2006.01) | |
| G01T 1/166 | (2006.01) | |

(52) U.S. Cl. .......... 705/4; 705/1; 705/11; 705/27; 701/29; 701/208; 701/216; 703/8; 707/511; 709/203; 709/209; 709/231; 725/90; 345/110; 345/827; 358/518; 715/515; 706/47; 348/51; 342/22; 250/363.04

(58) Field of Classification Search ............... 705/1, 4, 705/11, 27; 701/29, 208, 216; 703/8; 707/511; 709/203, 209, 231; 725/90; 345/110, 827; 358/518; 715/515; 706/47; 348/51; 342/22; 250/363.04

See application file for complete search history.

(56) References Cited

U.S. PATENT DOCUMENTS

| 5,063,377 | A * | 11/1991 | Smith | ............ 345/110 |
|---|---|---|---|---|
| 6,381,561 | B1 * | 4/2002 | Bomar et al. | .............. 703/8 |
| 6,470,303 | B2 * | 10/2002 | Kidd et al. | .............. 703/8 |
| 2001/0039474 | A1 * | 11/2001 | Hayashi et al. | ........... 701/208 |

(Continued)

*Primary Examiner* — Ella Colbert
*Assistant Examiner* — Sanjeev Malhotra
(74) *Attorney, Agent, or Firm* — Brinks Hofer Gilson & Lione

(57) ABSTRACT

A rich-media system allows a user to illustrate damage and request payment in accordance with an insurance policy or another arrangement. The rich-media system includes network servers that may operate and appear to remote client applications and remote computers as if the network servers were a single computer. A damage indicator tool resident to one of the network servers enables a remote user to visually illustrate damage to an item through a rich-media application. The damage indicator may support a relative pointing device and an absolute pointing device. An incident animator tool linked to the damage indicator tool in some rich media systems enables the remote user to visually recreate an event in a second rich media application. An optional scheduler linked to the incident animator tool and the damage indicator tool may enable the remote user to schedule an appointment to have the damage inspected or repaired.

40 Claims, 15 Drawing Sheets

U.S. PATENT DOCUMENTS

| | | | |
|---|---|---|---|
| 2001/0041993 A1* | 11/2001 | Campbell | 705/4 |
| 2001/0051958 A1* | 12/2001 | deVries et al. | 707/511 |
| 2002/0007289 A1* | 1/2002 | Malin et al. | 705/4 |
| 2002/0052807 A1* | 5/2002 | Han et al. | 705/27 |
| 2002/0095469 A1* | 7/2002 | Laux et al. | 709/207 |
| 2002/0169554 A1* | 11/2002 | Suda | 701/216 |
| 2003/0046115 A1* | 3/2003 | Hisano | 705/4 |
| 2003/0126609 A1* | 7/2003 | Shiah et al. | 725/90 |
| 2003/0184826 A1* | 10/2003 | Takemoto et al. | 358/518 |
| 2004/0104944 A1* | 6/2004 | Koay et al. | 345/827 |
| 2004/0117081 A1* | 6/2004 | Mori | 701/29 |
| 2004/0189795 A1* | 9/2004 | Ezawa | 348/51 |
| 2004/0199872 A1* | 10/2004 | Oakeson et al. | 715/515 |
| 2005/0004834 A1* | 1/2005 | Smith | 705/11 |
| 2005/0205792 A1* | 9/2005 | Rousso et al. | 250/363.04 |
| 2005/0273368 A1* | 12/2005 | Hutten et al. | 705/4 |
| 2006/0136236 A1* | 6/2006 | Horton | 705/1 |
| 2006/0170584 A1* | 8/2006 | Romero et al. | 342/22 |
| 2006/0184617 A1* | 8/2006 | Nicholas et al. | 709/203 |
| 2007/0094199 A1* | 4/2007 | Deshpande et al. | 706/47 |
| 2007/0156463 A1* | 7/2007 | Burton et al. | 705/4 |
| 2007/0266170 A1* | 11/2007 | Mockett | 709/231 |

* cited by examiner

Real-time alerts for customers during the claims cycle (i.e. when they can pick up their vehicle)

PROGRESSIVE DIRECT

Edit your profile | Ask us | 1-877-280-8418 | Log Out
Policy #: 12345678-0
Effective 02/18/05 - 08/16/05

| Your Policy | Payments | Your Documents | Policy Changes | Claims | Your Vehicle |

Home > Claims > Claims status

⚠ MESSAGE Your vehicle has been scheduled to start repairs on 09/21/2005 and estimate completed on 09/27/2005. View Complete Schedule.

YOUR CLAIM STATUS | ACCOUNTING & PAYMENTS | CLAIM DETAILS

SEPTEMBER 2005

| Sun | Mon | Tue | Wed | Thu | Fri | Sat |
|---|---|---|---|---|---|---|
|  |  |  |  | 1 | 2 | 3 |
| 4 | 5 | 6 | 7 | 8 | 9 | 10 |
| 11 | 12 | 13 | 14 | 15 | 16 | 17 |
| 18 | [19] | 20 | 21 | [22] | 23 | 24 |
| 25 | [26] | [27] | [28] | 29 | [30] |  |

COMMUNICATIONS

Date  Subject

09/22  ☐ Repair work has been started
09/21  ☐ CSC scheduled repair
09/21  ☐ Estimate complete
09/20  ☐ CSC Bedford scheduled drop off
09/19  ☐ Claim rep follow up
09/19  ☐ OCR collision claim reported Add a New Message

---

Your Coverage | Damaged Property

Medical Payments $500 Per Person

Roadside Assistance Yes

Collision
Acv Less $100 Deductible

Comprehensive
Acv Less $100 Deductible

Property Damage
$50,000 Each Accident No Deductible

UM/UIM - Per Policy Coverage
$100,000 Per Person - $300,000 Max

Rental Reimbursement

| Current Coverage | Days Remaining |
|---|---|
| $30 per day | 28 |

Payments
Total Out-of-Pocket  $500.00
Claim To Date  $1375.49

Open ✳

---

Claim #: 05-5176119

Report Date: 01/10/2005

Status: Open

Date of Loss: 01/08/2005

Location of Loss: Mentor, OH

Vehicle: 2005 Chevrolet Trailblazer Ext 4x4

Driver: Lisa Policyholder

CONTACT INFORMATION

Claim Rep: Joce Bien

Email Your Rep

Phone: 440.123.456

Service Center:

CSC Bedford
500 Broadway Ave
Bedford, Ohio 44146
440-987-6543

Directions

---

| FAQs | CALCULATOR & CHECKLIST | PERSONAL CONTACT INFO |

Your policy is underwritten by   User will have the ability to change when
Progressive Preferred Ins. Co.   and where they want to be called based on their schedule.

 VeriSign Secured   Copyright 1995 - 2004 Progressive Casualty Insurance Company. Patent Pending. | All Rights Reserved. Terms & Conditions. | Privacy & Security Policy | Contact Us Your policy is underwritten by:
Progressive Preferred Ins. Co.

Fig. 7A

Edit your profile | Ask us | 1-877-280-8418 | Log Out
Policy #: 12345678-0
Effective 02/18/05 - 08/16/05

Your Policy | Payments | Your Documents | Policy Changes | Claims | Your Vehicle Home > Claims > Claims status

 MESSAGE  Your vehicle has been scheduled to start repairs on 09/21/2005 and estimate completed on 09/27/2005. View Complete Schedule.

YOUR CLAIM STATUS

SEPTEMBER 2005

| Sun | Mon | Tue | Wed | Thu | Fri | Sat |
|---|---|---|---|---|---|---|
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 |  |

LABEL

COMMUNICATIONS

Date    Subject

09/22 ☐ Repair work has been started

09/21 ☐ CSC scheduled repair

09/21 ☐ Estimate complete

09/20 ☐ CSC Bedford scheduled drop off

09/19 ☐ Claim rep follow up

09/19 ☐ OCR collision claim reported

Add a New Message

ACCOUNTING & PAYMENTS

Your Coverage | Damaged Property

Medical Payments $500 Per Person

Roadside Assistance Yes

Collision
Acv Less $100 Deductible

Comprehensive
Acv Less $100 Deductible

Property Damage
$50,000 Each Accident No Deductible

UM/UIM - Per Policy Coverage
$100,000 Per Person - $300,000 Max

Rental Reimbursement
Current Cove...
$30 per day

Payments
Total Out-of-
Claim To Dat

CLAIM DETAILS

Claim #: 05-5176119

Report Date: 01/10/2005

Status: Open

Date of Loss: 01/08/2005

Location of Loss: Mentor, OH

Vehicle: 2005 Cheverolet Trailblazer Ext 4x4

Driver: Lisa Policyholder

CONTACT INFORMATION

Claim Rep: Joce Bien

Email Your Rep

Phone: 440.123.456

Update your calling preferences:

Primary Phone Number
(___)-(___)-(____) [Home ▾]

Secondary Phone Number
(___)-(___)-(____) [Work ▾]

Tiertiary Phone Number
(___)-(___)-(____) [Cell ▾]

[Update Preferences]

Edit Your Personal Contact Info

FAQs | CALCULATOR & ...

User will have the ability to change when and where they want to be called based on their schedule.

 Copyright 1995 - 2004 Progressive Casuality Insurance Company. Patent Pending. All Rights Reserved. Terms & Conditions | Privacy & Security Policy | Contact Us Your policy is underwritten by: Progressive Preferred Ins. Co.

Fig. 7B

RICH CLAIM REPORTING SYSTEM

PRIORITY CLAIM

This application claims priority to pending U.S. Provisional Application No. 60/801,462, filed May 18, 2006, entitled "Rich Claim Reporting System," which is incorporated herein by reference.

BACKGROUND OF THE INVENTION

1. Technical Field

This application relates to claim reporting and more particularly to an on-line claim reporting system.

2. Related Art

A goal of some insurance providers is to reduce the frustration and expense associated with claims. Some disputes center on insurance coverage and the risks that may be covered. Other disputes concern liability limits and who is insured. Increasingly, late reporting of insurance claims has caused disputes related to delays, denials, and non-payment of claims.

Some providers use a form-based system to minimize the frustration and expense associated with processing insurance claims. These form-based systems require customers or insureds to describe claims in detail. Customers or insureds may be asked to describe the circumstances surrounding a claim or provide measurements that indicate where damage occurred. Some forms do not gather information that is unique to an incident or must be scanned before information is processed.

There is a need for a system that enables the customers or insureds to provide incident details. The system may reduce the burden of describing an incident while allowing a user to describe the incident in context.

SUMMARY

A rich-media system allows a user to illustrate damage and request payment in accordance with an insurance policy or another arrangement. The rich-media system may include network servers that operate and appear to remote client applications as if the network servers were a single computer. A damage indicator tool resident to one of the network servers enables a remote user to visually illustrate damage to an item through a first rich-media application.

An incident animator tool is linked to the damage indicator tool in an alternative rich-media system. The incident animator tool may be resident to one of the network servers and may enable the remote user to visually recreate an event in a rich media application. An optional scheduler linked to the incident animator tool or the damage indicator tool enables a remote user to schedule an appointment for an inspection or repair.

Other systems, methods, features, and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 7 is an exemplary alert.

DETAILED DESCRIPTION OF THE PREFERRED EMBODIMENTS

Figure 1A:
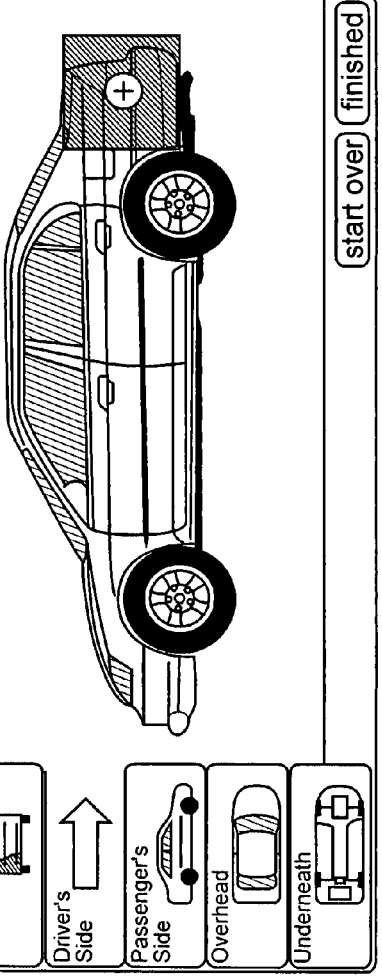
FIG. 1 is an exemplary damage indicator tool.

A claim management system streamlines a settlement process by coordinating the activities that may be associated with an incident or an insurance claim. Through visuals generated through rich media, insureds, claimants, or others may enter and submit information accurately and efficiently by gathering information closer to the time of an incident. Some rich media systems facilitate faster and more comprehensive claims reporting (24 hours/7 days a week access) through menus, icons, or screens tailored to the user's experience or circumstance. In some claim management systems information is processed in a way that a user may find logical, natural, or easy to use. If an item is minimally damaged, for example, predetermined rules that govern associations, relationships, or in some instances, inferences about the information submitted by a user may lead to a successive screen, menu, or dialog box that promotes a repair rather than a replacement.

Some claim management systems may enhance the collection of information related to a claim by gathering that information in real-time, near real-time, or after a delay at a physical or a virtual site. The systems may leverage data by distributing the data to an entity or person that has an interest in the incident or claim. The systems may be used on a local area and/or wide area network that may split processing of an application between a front-end client and a back-end server or server cluster in a-client/server architecture. The client may comprise a local or remote stand-alone computer or controller that may execute various computer applications and may be a customized to a web based process. The server or host server may comprise a computer or a group of independent network servers that operate, and appear to clients, as if they were a single unit. The server may comprise program (s) that provide time sharing and data management between clients, provides multi-user functionality, supports persistent and/or non-persistent connections with clients, and/or may provide various firewalls and other security features.

The logic and programming may be distributed among multiple computers and other devices, some of which may work independently but also may communicate with other devices that have similar or different operating systems. The systems may format data so that the systems provide useful content that may be used or supplemented while reducing the amount of data entry required to process one or more claims, such as insurance claims. Some systems include hardware and/or software that quantify data. Visual data may be quantified (e.g., in some cases, translated into numerical values based on a point scale) to process or settle a claim. Settlement may occur automatically in real-time, near real-time, or after some delay. A real-time activity or operation may be those in which a machine's activity match a human perception of time or those in which a controller, server, or a computer's operations proceed at a same rate as a physical or external process, or the processing of information at the same rate as the information is received. A real-time activity or operation may respond to situations as they occur. Some systems allow representatives, such as insurance representatives, or central loss reporting unit representatives to facilitate claim processing and/or claim settlement.

A claim management system may be coupled to multiple clients or remote computers supporting web browsers and/or graphical interfaces. Information may be encrypted, use digital signatures, or may be processed or supplemented with other security measures to protect the integrity of the information. Clients may be coupled to the claim management system through a matrix of networks, gateways, bridges, routers, and/or other intermediary devices that handle data transfer and/or data conversions from a sending network protocol to a similar or different receiving network protocol. Intraware, groupware, or other software may translate the data received from the clients or remote computers to the data that is received and stored on a host server through a publicly accessible network like the Internet or a privately accessible network like an Intranet. The data may include text, graphics, images, video, multimedia, and/or other information that may be stored at substantially the same rate the data is received, after some delay, or at a near real time rate in memory resident to or coupled to the remote computer and/or host server.

Figure 1B:
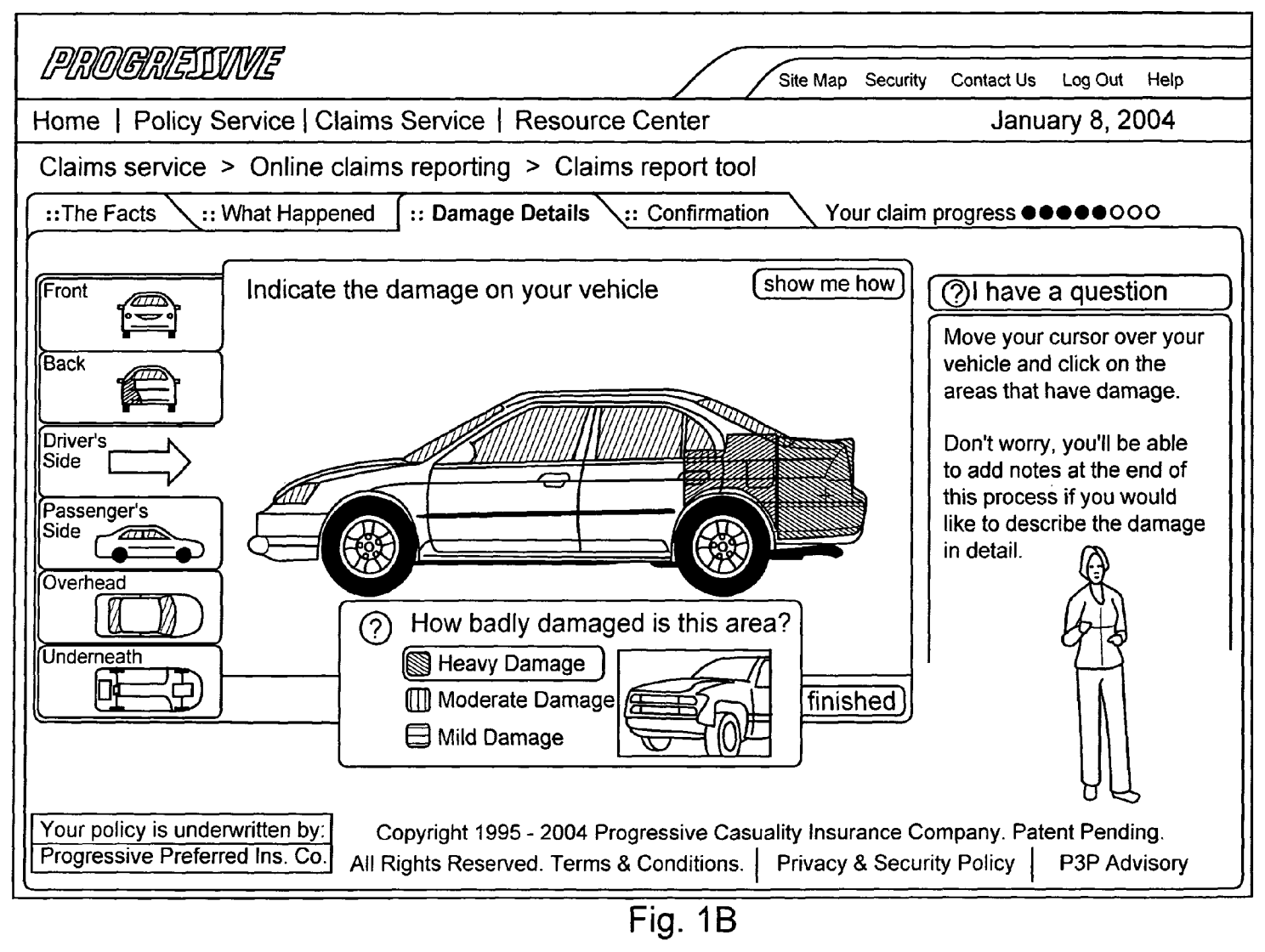

The damage indicator tool shown in FIG. 1 allows an insured or a user (e.g., claimant or another) to access a web-based rich media technology (e.g., Windows Media, Macromedia Flash, Java) that may deliver interaction or multimedia, or interactive technologies through a host server and remote computer. The host is connected to the insured or user's remote computer over a communication link such as a wireless link (e.g., a wireless interface or controller), a tangible link, or some combination. Miniature versions of images or versions of web pages are positioned near the edge of the damage indicator tool on the user's display. These images allow the user to quickly browse through multiple images, pages, or documents that may be linked to one or more full sized images. In some systems, the images are linked through a hypertext reference that may ensure that a respective image persists on the desktop of an insured or user's desktop of their remote computer. In FIG. 1, the front, rear, sides, top, and bottom images of a vehicle may be loaded into a user's web browser more quickly than the full sized images. These thumbnail views may be selected or clicked on to load the enlarged images into a larger windowed portion adjacent to the thumbnails on a user's display.

To understand the severity of a claim and assess potential loss, the insured item is displayed through the user's remote computer and web browser. In FIG. 1, a device or structure for transporting persons or things is displayed. In some systems, the process that identifies the user to the host server may identify and display the insured item(s) and may display a policy number and a policy name. A username and/or password may also identify details of the insured and/or insured item. In FIG. 1, the year, make and model of the user's vehicle is displayed. In some systems image libraries or graphical libraries of multiple vehicles or multiple vehicle platforms are stored in memory through one or more databases. An image and text of a particular year, make, or model that corresponds to an insured item may be selected through the host server and transmitted to the user's remote computer and web browser. An image of the insured item and some of its attributes may be transmitted through Hypertext Markup Language (HTML), dynamic HTML, Active Server Page (ASP) documents, scripting language, or other computer protocols through a secure channel (e.g., Secure HTTP and/or a secure socket layer) or may be encoded and transmitted through an unsecured channel. Using the same or different protocols other systems may transmit particular or generalized images or graphics of the insured item that are rendered through the user's web browser.

Through a relative and/or an absolute pointing device a user may graphically illustrate the basis for a claim. In FIG. 1, the user may move an on-screen cursor to illustrate the damage to a vehicle. In some systems, the on-screen cursor may turn into a sighting reference, such as a cross-hair when the cursor is positioned above a linked element overlaid or within the image. When selecting the linked element the user may indicate the severity of damage to the insured item. In FIG. 1, an element selection generates a color menu or toolbar that allows the user to indicate the severity of damage through a color or other indicia selection. In some systems sliding tools allow the user to select colors or other indicia associated with the level of damage or an indication of loss. When a linked element is colored, thumbnails of those elements may be displayed in the same or similar indicia or color. In some systems users may identify damage or loss to any part of the insured item by modifying the colors, indicia, textures, or patterns of an image. In these systems damage or loss may be illustrated by dragging and dropping dynamic or static objects on top of or within the displayed item.

To gather more information, the damage indicator tool may include a dialog box or HTML form that allows a user to enter text. The text may be saved in a text file through the host server and may comprise a word-processing file or an ASCII file encoded in a format that a server or client may read. The dialog box or HTML form may also facilitate interactive exchanges. In some circumstances a user may submit a question that is transmitted to the host server and answered in real-time, near real time, or after some delay at the user's remote computer. Some host servers may receive digital images or scanned photographs that may be collected, associated, or linked and stored with a claim related data through the host server.

Once a user is finished describing the damage or loss to an insured item, the user may select a graphic element or button that completes the collection of information, submits the information, and stores the reporting session in memory resident to or coupled to the host server. The host server may transmit a confirmation message, data, or a window to the client to confirm completion. In some systems, the host server will transmits a list of the damage or loss information through text and/or graphics before logging off or terminating and storing a reporting session. If more information should be added or changed, the user may access the damage indicator tool to correct or supplement the data.

Figure 2A:
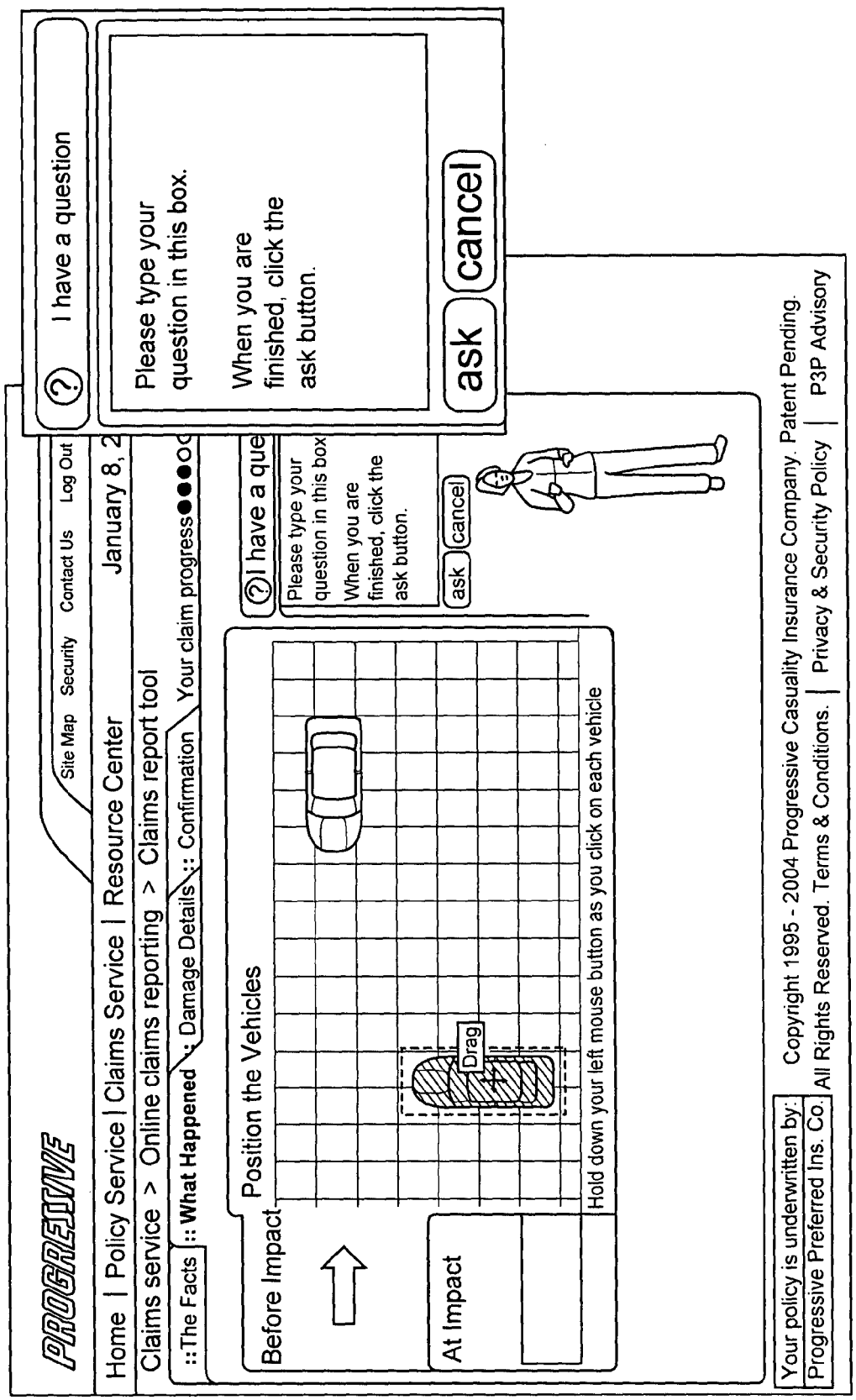
FIG. 2 is an exemplary incident animator tool.
Figure 2B:
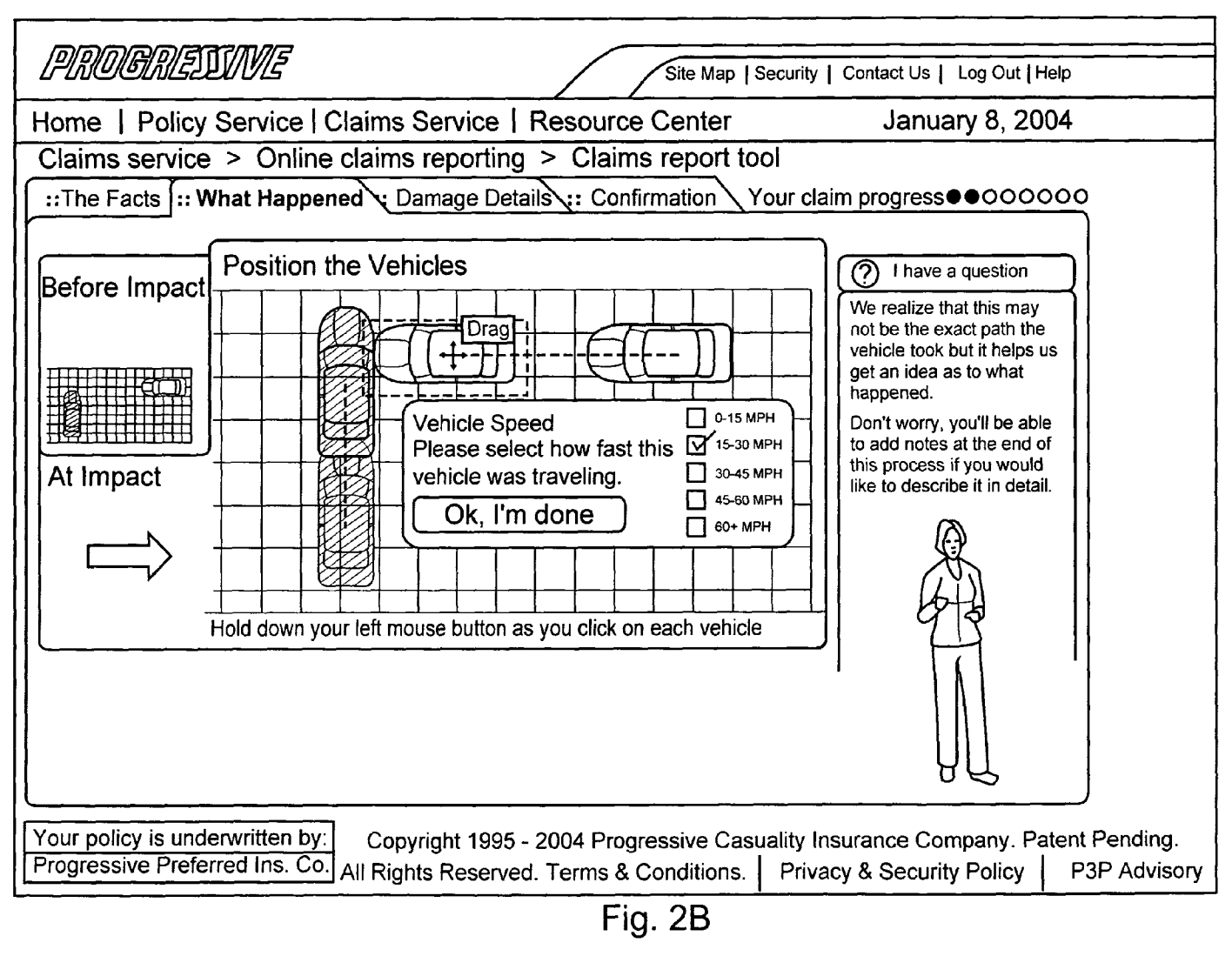

An incident animator tool shown in FIG. 2 may be encompassed within the damage indicator tool of FIG. 1, linked or hyperlinked to the damage indicator tool or another application, or may comprise a separate standalone system or application. Using the client server architecture or other computer architectures, users may recreate the circumstances leading to a claim. The incident animator tool may recreate the scene of an accident through site, speed, damage estimates, and/or other information through a rich media technology (e.g., Windows Media, Macromedia Flash, Java) that may deliver interaction or multimedia, or interactive technologies through a host server and a remote computer. The incident animator tool may reconstruct an accident or collision between one, two, three, or more vehicles in two, three, and/or four dimensions. In some systems a fourth dimension comprises time. In FIG. 2, two vehicles are shown in a two dimensional view.

Through a graphical interface accessible through a remote computer, a user may illustrate a scene before and/or after an unexpected event, such as a collision between one, two, or more cars. In some systems, a user may position vehicles as they appeared prior to the accident. Using a drag-and-drop graphical user interface the user moves images from one position on the screen to another by "grabbing" it and pulling it to its new location through an absolute and/or relative pointing device. As an image is moved or when an image is released, which in FIG. 2 comprises an image of a vehicle, a dialog box or other input may appear to gather additional information. The gathered textual and/or graphical information may be related to the vehicle's movement and may include speed, direction, roll, and/or other data or estimates.

Once pre-collision information is collected, a user may enter information relating to impact by selecting other controls. The controls may be displayed through a toolbar, dialog box, or other application that solicit a response from a user. When a selection occurs, a miniature image or version of the image may be displayed near the edge of the display window. When the image is "locked" down in some thumbnail views a nearly identical image may appear in a larger window on the user's display. In some systems recreating the scene of an accident, the image of the vehicle may be linked by a path line that indicates the path the vehicle may have traveled before impact, at impact, and in some systems, after impact. In other systems the path line or an additional path line may indicate the path of travel of other tangible object(s).

Using the drag-and-drop graphical user interface a user may position the vehicle to its position at impact when recreating the scene of an accident. Once in position another dialog box or other input may appear to gather or solicit other information. The dialog box or input may gather or solicit responses from a user about approximate speed, direction, roll, and/or other information. The dialog box or input may include a path selector tool that gathers or solicits information about the path of travel of the vehicle and/or other tangible or physical object(s). The path selector tool may allow a user to modify the path or illustrate the path of travel of one or more vehicles. Some systems may illustrate nearly concave, nearly convex, nearly straight line paths or a combination of paths. Once complete the process is repeated until the incident animator tool captures and stores the relevant information in a host computer or the user ends the reporting session. In FIG. 2, the incident animator tool may gather or solicit other graphical and/or textual information through other dialog boxes, inputs, or HTML forms.

Image position and diagram creation may be aided by an interactive utility that guides the user through each step of the scene recreation. In some systems a wizard guides the user through scene re-creation. Once complete an accident may be previewed through the host server that renders a tweened animation that may be transmitted to the user's remote computer. In a tweened animation a user develops the key frames at important parts in the animation and a program resident to the server or remote computer creates the content of the frames in between. Using an interactive help utility, such as a help wizard, a user may create and revise the animation to create a precise and accurate recreation.

The animation and underlying information may be stored at the host server or in another device coupled to the server. Some incident animator tools store animations in files. The files may comprise text files, Extensible Markup Language files and/or other formats. A windows based interface within the incident animation tool may be updated at synchronous or asynchronous intervals and may communicate with a library or database of vehicles or other static or dynamic objects stored within or coupled to the host server. The vehicles may be identified through a user's identification that may comprise a user identification and password or by an identification of an insurance policy or other indicia. A user identification may comprise a unique string of characters that allows access to the claim management system, a unique string of characters that may be used to identify an insurance policy, and/or a vehicle for which a claim is being reported.

Some incident animator tools accept information from measuring instruments input devices, or vehicle controllers or vehicle computers internal or external to one or more vehicles automatically. The instruments or controllers may capture vehicle sensor outputs that may reflect the speed, acceleration, and/or other vehicle data. This information may be transferred from the measuring instruments, controllers, or through the input device through a wireless or a tangible link or interface to the host server at a synchronous interval or asynchronously. A database of scenes or maps coupled to the host server may add more aspects or details to the animations when locations are manually or automatically identified. Information about position, velocity, and time may be identified by a positioning system, such as a global positioning system, a navigation system, or a vehicle data logger that may be linked to the data or the insured item. Some animator tools allow users to add or select lighting (e.g., light, dark, moonlight, dusk), weather effects (e.g., snow, rain, fog), highway objects (e.g., highway dividers, guard rails, construction barrels, pylons, fences, etc.) and/or add pedestrians that are also stored or coupled to the host server. The speed of the weather effects, movement of the highway objects, and/or movements of pedestrians may also be defined by the user or estimated by a program coupled to the host server based on submitted information in some incident animator tools. Other incident animator tools may gather this information automatically by querying weather service servers or providers, road condition transportation servers or providers, and government information providers or government sponsored servers (e.g., servers that gather police reports or accident details) through automated programs that search the Internet or other networks that retain content-related information.

Figure 3:
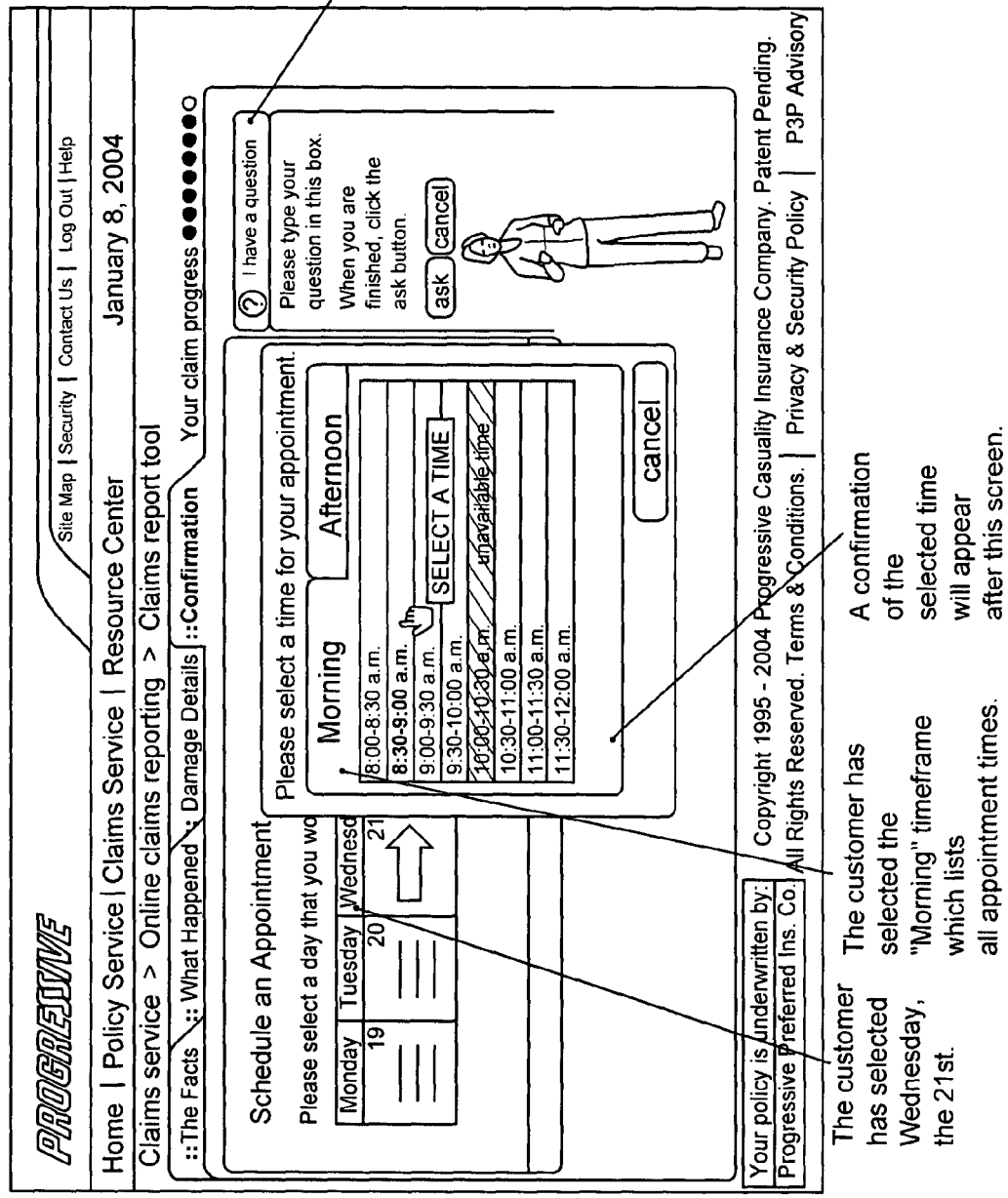
FIG. 3 is an exemplary catastrophic scheduler.
Figure 4:
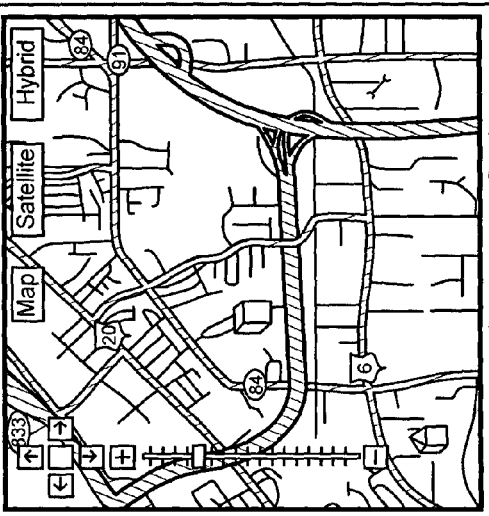
FIG. 4 is an exemplary map.

A catastrophic scheduler shown in FIG. 3 may be encompassed within the damage indicator tool of FIG. 1, and/or the incident animator tool of FIG. 2, linked or hyperlinked to one or both of those systems or applications or to another system or application, or may comprise a separate standalone system or application. The scheduler may comprise an application program resident to or coupled to the host server. Some schedulers comprise a calendar program that resembles wall calendars that may display dates in blocks labeled with the days of the week and may include time intervals (e.g., hours, minutes, etc.); other calendars may display dates day-by-day by one or more weeks at a time and enable users to enter real-time or near real-time appointments by date and time, notes, and enter other information. Some catastrophic schedulers deliver content through a rich media technology (e.g., Windows Media, Macromedia Flash, Java) that may deliver interaction or multimedia, or interactive technologies through a host server and remote computer.

When a user logs in, his or her username and/or password may identify details about the insured, user, and/or where an insured item may be located. This information or other identifying information may be used by the catastrophic scheduler to generate customized calendars. For example, when an insured or user selects a catastrophic scheduler, the host server may process this information and transmit static and/or dynamic objects to the remote computer that renders a calendar displaying the dates one or more representatives such as one or more insurance representative, a catastrophic team, or a claims adjuster, from an may be in town. In some calendars, days that have passed may be marked (e.g., shaded, highlighted in a different color or other indicia) to indicate that they are not selectable. Other days that are not available may be similarly marked.

When a user selects an available day, the system or application sends static and/or dynamic objects to the client (e.g., remote computer) that renders a screen that allows the user to select a morning or afternoon appointment. The color, texture, patterns, and/or picture that comprise the previous screen may remain in the background on a user's display as an inactive application in a common or separate window. In some systems, the application or system may identify the portion of the day that has an opening that is consistent with the user's morning or afternoon selection. If a portion of a selected period is not available it may be marked (e.g., shaded, highlighted in a different color or other indicia). An on-screen help feature may assist the user with any selections or displayed information. This feature may be activated by selecting an icon in a toolbar or positioning the cursor above the item for a predetermined period of time. In some systems, a cartoon dialog balloon may appear when the cursor is positioned above that portion of the day that is fully booked. In some on-line systems help messages may appear as pop-up windows when a user clicks on a screen in which help is desired. Alternatively, a special form of selection, such as a clicking of a right mouse or option clicking will activate a pop-up help information, if it is available.

When the user selects a time of day such as a morning or afternoon, a full schedule may expand below the option or may be displayed in a separate window. In some systems, those portions of the day not selected will remain on the user's screen but may be marked to indicate that they were not selected. Unavailable time slots may be similarly marked. Since some catastrophic scheduler applications or systems are arranged in a tree-structure or hierarchical order, the selection of an icon or graphics element such as a close/cancel button may be actuated at any point to return to a previous screen.

When a user selects or requests an available time, a confirmation window or data will be transmitted to the client to confirm the selection. The confirmation window or data may allow the user to confirm the time slot or chose another. If not confirmed, the system or application may return the user to a prior scheduling screen. If confirmed, the system or application transmits static and/or dynamic objects to the client that render an electronic calendar with his or her appointment marked. In this view, the user may modify his or her appointments through the same or similar process that scheduled his or her appointments.

In some systems and applications, feedback is sent to the user during or after a scheduling session. The feedback may comprise a document, a web page, data, a message (e.g., electronic mail), or a combination that confirms a scheduled appointment. The feedback may include one or more static or dynamic objects configured such that selection by a recipient causes information sufficient to identify the recipient and some of the scheduled appointment to be sent back to the network site serving the web page. An object refers to an entity exchanged between a client and a server. A dynamic object may be created on the fly when a request is made. Static objects are pregenerated, independent of client requests. Some objects include data related to the time and date of an appointment, a policy number, related information to a catastrophic claim, a map designating roads of a region to a location (e.g., claim processing center) that may or may not include a set of guidelines and directions, contact information, explanations of processes such as claim processing methods, answers to frequently asked questions, and a list of things to bring to a center.

In those systems that provide static or real-time maps (e.g., systems that communicate with a vehicle navigation system or render and transmit the maps to a remote computer), the host server may interface mapping software or access libraries of maps. Some catastrophic schedulers add or schedule events to a user's personal calendar or may transmit destinations and/or maps to a user's navigation system or wireless devices. These systems and applications may add events to one or multiple mobile calendars (e.g., blackberries, Palm Pilots, wireless devices/phones, other portable wireless devices) to schedule events by month, dates, and time and provide destination directions wirelessly.

Figure 5A:
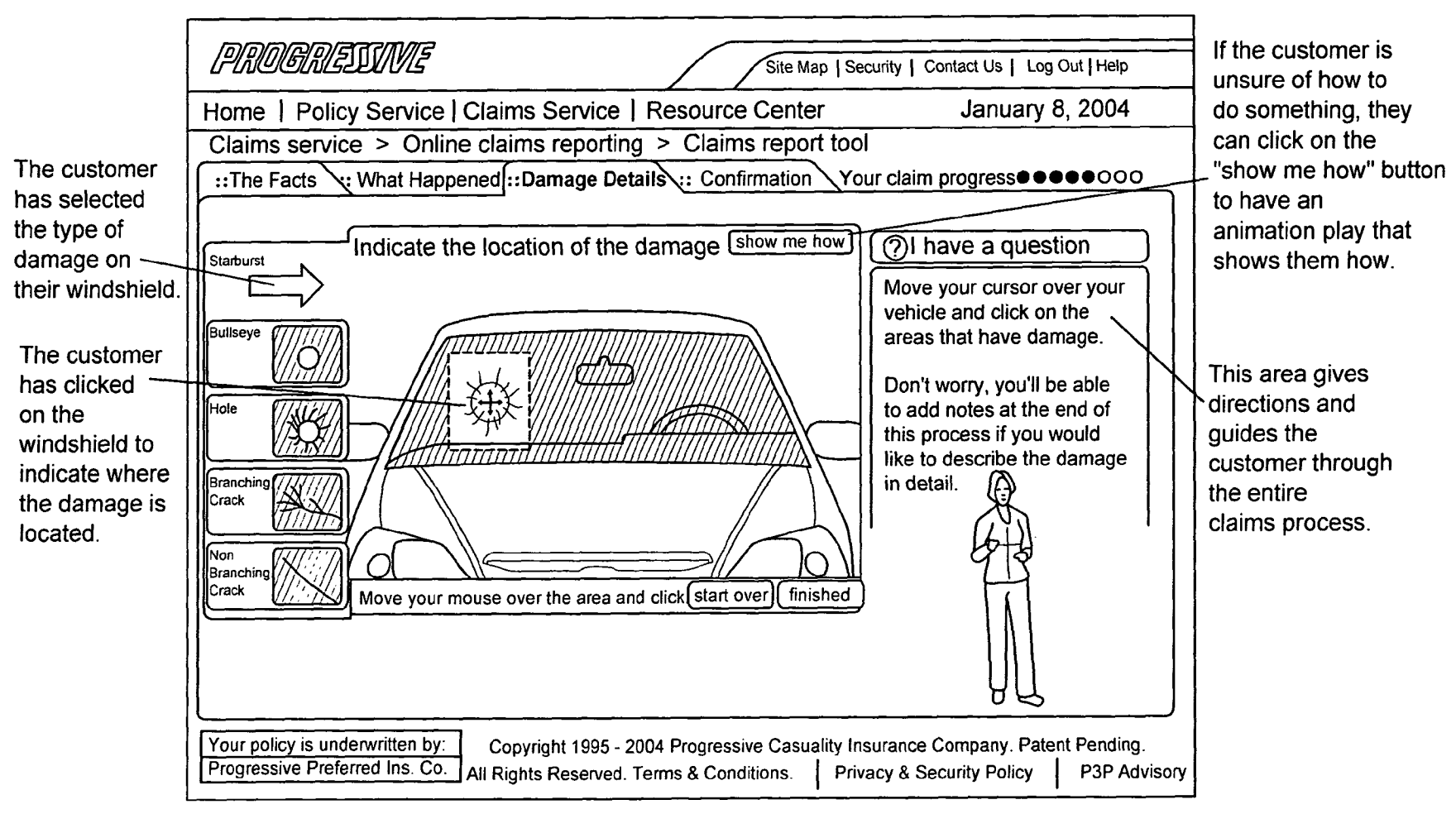
Figure 5B:
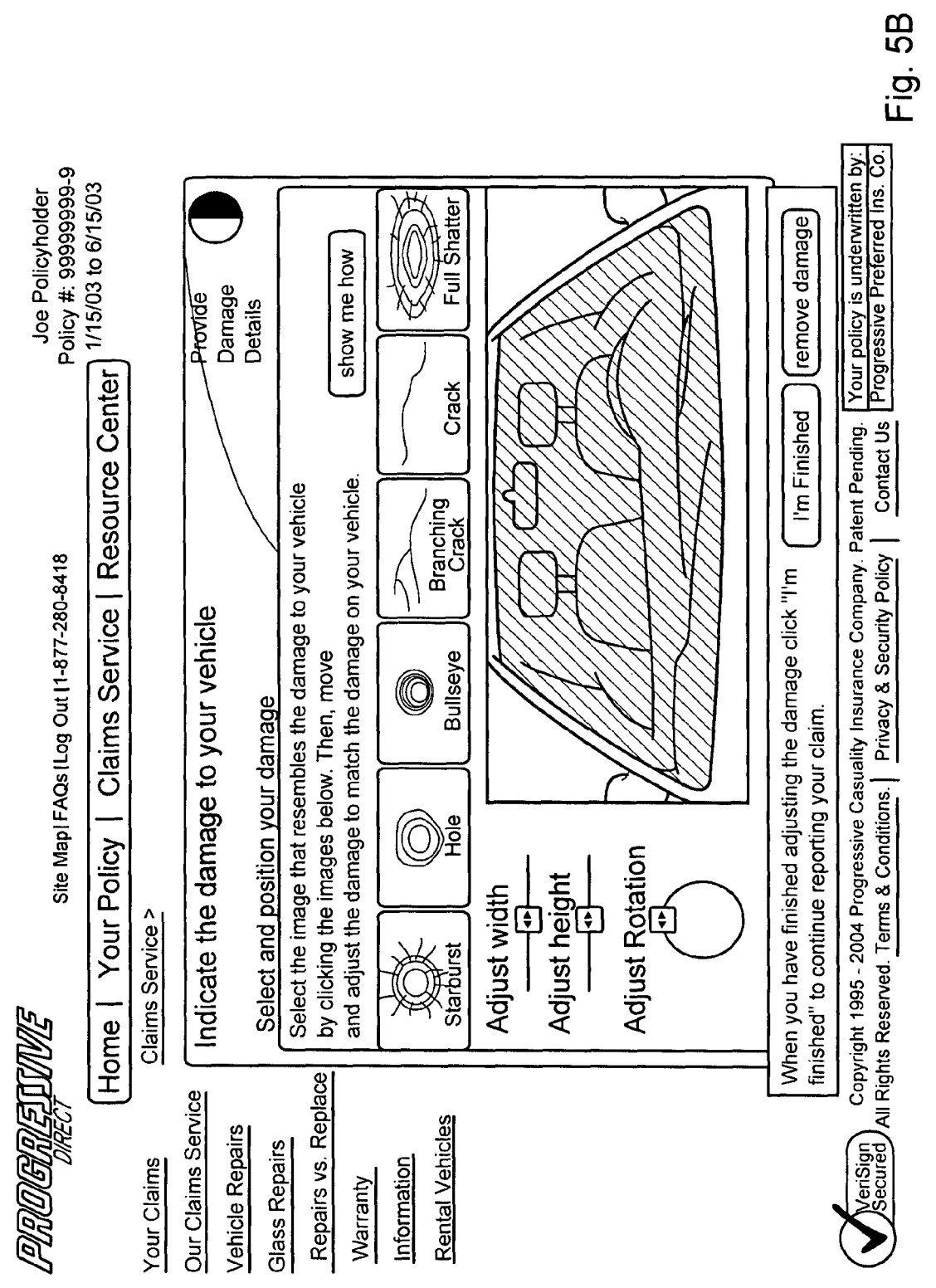
Figure 5C:
FIG. 5 are exemplary windshield damage indicators.

Windshield damage indicators shown in FIG. 5 may be encompassed within the damage indicator tool of FIG. 1, and/or the incident animator tool shown in FIG. 2, and/or the catastrophic scheduler shown in FIG. 3 or linked or hyperlinked to one or more of those systems or applications or to another system or application, or may comprise a separate standalone system or application. The windshield damage indicator allows a user to graphically illustrate damage to a framed pane of glass or other transparent shielding through a web-based rich media technology (e.g., Windows Media, Macromedia Flash, Java) that may deliver interaction or multimedia, or interactive technologies and through a host server and remote computer. In FIG. 5, the glass or transparent shielding comprises a windshield that is located in front of an occupant's seat.

To illustrate the severity of damage, some windshield damage indicators display a pane of glass. In FIG. 5, the glass is framed by a portion of a vehicle. In some systems, the process that identifies the user to the host server may identify and display a particular windshield and when coupled to insurance systems may display a policy number and a policy name. In some systems image libraries or graphical libraries of glass panes or windshields are stored in memory through one or more databases that are linked to the host server. An image and related text of a particular make or model that corresponds to the user may be selected through the host server and transmitted to the user's remote computer and web browser. An image of the item and some of its attributes may be transmitted through Hypertext Markup Language (HTML), dynamic HTML, Active Server Page (ASP) documents, scripting language, or other computer protocols through a secure channel (e.g., Secure HTTP and/or a secure socket layer) or encoded and transmitted through an unsecured channel. Using the same or different protocols, other windshield damage indicators may transmit particular or generalized images or graphics of a windshield that are rendered through the user's remote computer and web browser. The images may display the front of a vehicle with a point of reference such as a steering wheel and car seats that are visible through the windshield.

Through a relative and/or an absolute pointing device, a user may graphically illustrate the damage to the windshield. In FIG. 5, the vehicle windshield may comprise a client-side image map whereby regions of an image may be clicked on with a pointing device to indicate his or her selection. In some systems, the on-screen cursor may turn into a sighting reference, such as a cross-hair when the cursor is positioned above one or more linked elements. In FIG. 5, a row or a block of on-screen buttons or icons may comprise the linked elements. Some of the linked elements are shown as a starburst object, a bull's-eye object, a hole object, a branching or not branching crack object that are activated when selected by a relative and/or absolute pointing device.

When one of the linked elements displayed in the damage toolbar is selected, a textual or graphical prompt may direct the user to indicate one or more damaged area on the windshield image. In some windshield damage indicators, when a user selects a type of damage one or more images of the selected objects may be displayed on the user's display to indicate its selection. In FIG. 5, the cursor may turn into a ghosted image of the selected damage object when the cursor is positioned above the windshield; in some other systems, the cursor may turn into a ghosted image when the object is first selected. At the user's direction the damage object may be deposited or positioned onto the windshield. With a click of a pointing device, such as a mouse, the damage may be positioned and re-positioned by dragging objects on the user's display or screen. In some systems and applications a fly-out menu may appear near a side of the windowed image to provide the user with the ability to scale (e.g., adjust the width and height) and/or rotate the damage. A row or column of on-screen buttons displayed below or to the side of the windowed image may allow the user to re-position damage, remove selected damage, save and/or end a placement.

When the damage is properly placed, a textual or graphical prompt may ask if there is additional damage to identify. The textual or graphical prompt may appear in place of a toolbar shown in FIG. 5. If there is additional damage to report, the process is repeated. Otherwise, a textual or graphical prompt may ask if the damage is correctly shown.

If the damage is correctly shown (e.g., a user selects or enters a positive response), the host server may send feedback to the user during or after the reporting session. The feedback may comprise a document, a web page, data, a message (e.g., electronic mail), or a combination that confirms receipt of the information through a confirmation notice. A confirmation notice may include a damage report that may include a damage diagram. If the damage is not correctly illustrated (e.g., a user selects or enters a negative response) the host server may re-open the reporting session allowing the user to modify or supplement the damage illustrated or entered. If a user elects to clear the damage, the system and application may restart the process by starting a new reporting session.

Figure 6A:
FIG. 6 is an exemplary scheduler.
Figure 6B:

Some windshield damage indicator systems and applications may automatically determine if a windshield should be replaced or repaired or in the alternative, promote one option over the other based on pre-programmed rules. A decision or a recommendation may be based on the amount, severity, and position of the damage. If a controller or inference engine coupled to the host server or the host server makes that determination, an integrated scheduler, like the catastrophic scheduler shown in FIG. 3, or an integrated scheduler shown in FIG. 6, may allow a user to set-up (and/or change) a date and time for an inspection and/or repair with or without a phone call to an insurance provider or service provider in a continuous on-line session. In some systems, the user's prior identification may suggest convenient repair facilities and some systems may send directions to a user's remote computer or in the alternative, a navigation system, or a wireless device/phone. Other systems, such as those shown in FIG. 5, may solicit information concerning where the damage occurred or where a repair is requested and allow the user to self-schedule a repair at one or more affiliated or linked repair centers, and similarly provide directions to the user's remote computer or in the alternative a user's navigation system, or a wireless device/phone. In some systems an inference engine comprises a processor that matches a users input with rules contained in a knowledge database to derive a conclusion that may be transmitted to a user.

Each of the systems and applications described above may provide real-time alerts for customers or users presenting claims. The alert may comprise an email feature that sends messages to the recipient. The email feature may include a hyperlink selectable by the recipient. The hyperlink may be configured such that selection by the recipient causes information sufficient to identify at least the recipient and data associated with the alert to be transmitted to the system. Some real-time alerts are accessible through a web page that may display the status of a claim, a log of communication, claim details, and/or contact information as shown in FIG. 7. In some insurance applications, the insureds may monitor their claims through one or more web pages and have the ability to change how, when, and/or where they want to be called. The web pages may provide access to information on their policy or policies, payments, documents, policy changes (made or may be made), claims, and information about the insured item (e.g., in FIG. 7, vehicle(s)).

Figure 8:
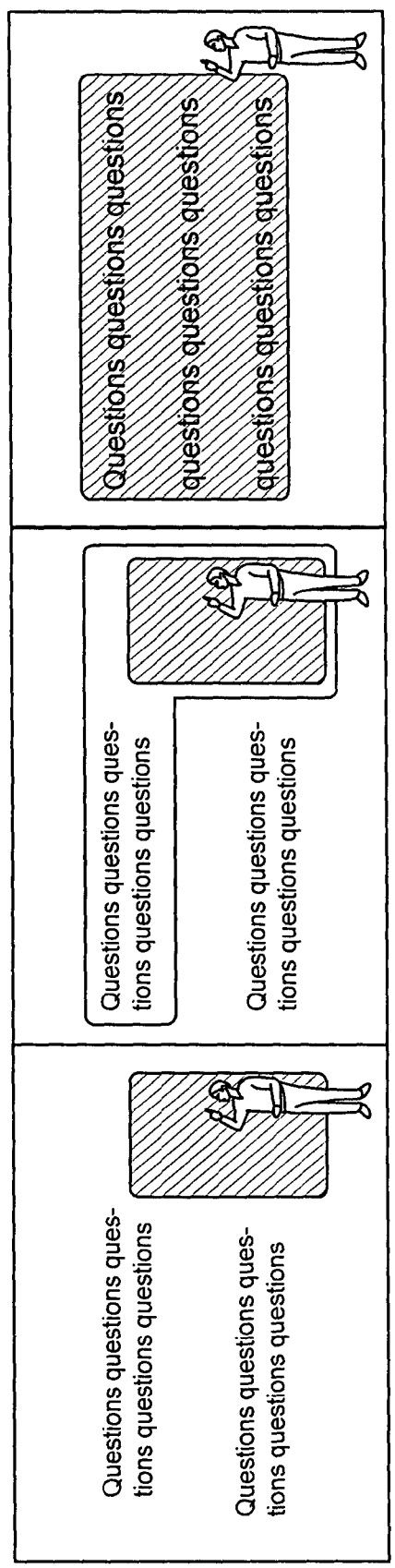
FIG. 8 is an exemplary concern capture tool.

Each of the systems and applications illustrated or described may be linked to a tool that may answer a user's questions and/or capture his or her concerns. The concern capture tool may gather information or address user's concerns about on-line claim reporting processes. In one tool, graphics, text, animation, and/or a video (as shown in FIG. 8) may introduce the user to the screen. The media may direct the user to a separate window if they have any questions.

Questions may be submitted through a dialog box or HTML form that allows a user to enter text or in an alternative system, an audio and/or a video file. The text may be saved in a text file through the host server that may comprise a word-processing file or an ASCII file encoded in a format that a server or client may read. If the question may be answered from a database that may be associated with frequently asked questions, the user is provided with that option. The dialog box or HTML form may also facilitate interactive exchanges. If answers are not available in real-time or near real-time, in FIG. 8, a video, audio file, or flash display may explain that their question will be answered by a claim representative.

As further shown in FIG. 8, additional information related to each question may appear above and/or behind the video. The video may be linked to graphic that highlights the questions the video may be addressing. If the user or insured asks to submit one or more questions, a subsequent screen may list these questions before logging off or terminating the concern capture session. The video may prompt the user or insured to review and/or add any additional questions before advising the insured or user that the questions will be submitted.

Figure 9:
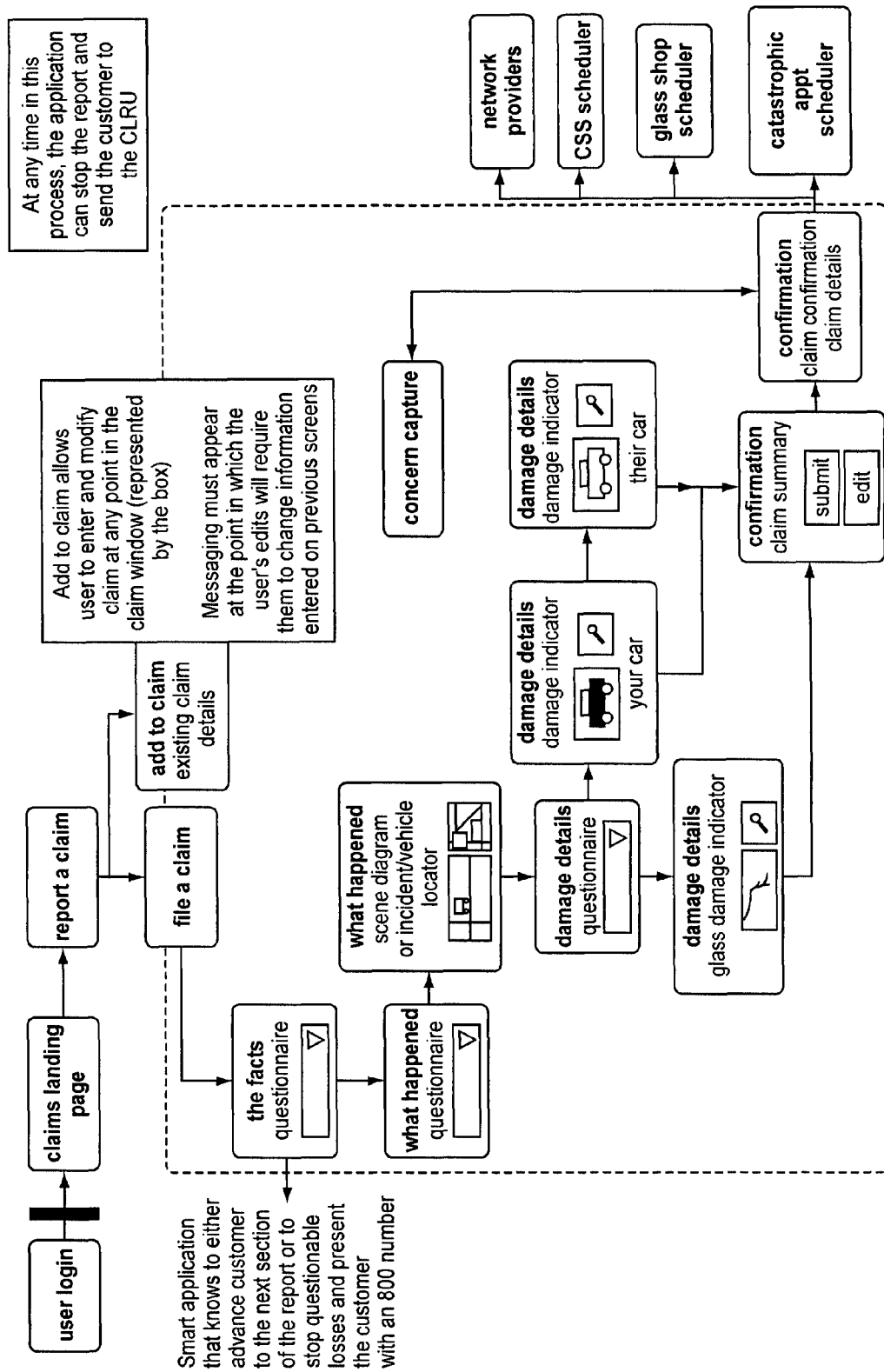
FIG. 9 is an exemplary interlinked system or application.

While each of the systems and applications may stand alone or may be encompassed within the other systems and applications, the systems and applications may also be coupled, linked or hyperlinked to one another and accessed through a continuous on-line session. FIG. 9 illustrates one example of an interlinked application or system that is linked to questionnaires and is coupled to interfaces that provides access to remote application and systems. In FIG. 9, the interfaces are coupled to vendors, network providers, and schedulers.

The above described systems may be used or embodied with many technologies. The systems and methods may be created through rich media applications through the Internet or other publicly accessible or privately accessible networks. Through complete or partial visuals generated through rich media, insureds, claimants, or others may interactively enter and submit information accurately and efficiently. The rich media systems may facilitate faster, more immediate, more accurate, and/or more comprehensive claims reporting through menus, icons, and/or screens tailored to the user's experience. Some claim management systems process information interactively in a way that a user may find logical, natural, and easy to use. Using an expert system, intelligent database, or predetermined rules that may govern associations, relationships, and/or inferences about the information received some claims management systems or individual components (or applications) may automatically recognize and make decisions in response to the information received. In some claim processing systems, an exemplary decision may promote or direct a user to a repair rather than a replacement. In some systems this may occur through the sequence and rendering of subsequent screens. The systems and methods may be implemented within any rich media technology, including, but not limited to Flash, Flex, Java, AJAX and XMAL and all device footprints which access rich-media internet applications including desktops, navigation systems, mobile devices, set top boxes and game consoles.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A rich media method that allows an insured to illustrate damage and request payment in accordance with an insurance policy comprising:
    receiving identification data from a remote computer that identifies a user and an insured item;
    accessing a rich media application that generates dynamic objects that are transmitted to the remote computer to render an image of the insured item or a portion thereof;
    receiving relative or absolute data from the remote computer in response to the user selecting a linked element of the image of the insured item or the portion thereof to identify a damaged area of the insured item;
    assigning an indicia to the damaged area of the insured item that corresponds to the relative data or the absolute data;
    storing data that identifies the damage to the insured item in a server programmed to receive insurance claims in accordance with an insurance policy; and
    transmitting data to the remote computer that renders a graphical user interface at the remote computer that enables the user to visually recreate an event that resulted in the damaged area of the insured item.

2. The rich media method of claim 1 further comprising providing on-line access to a claim management system in which the user may navigate through product pages that allow the user to illustrate damage to the insured item.

3. The rich media method of claim 2 further comprising maintaining image libraries of multiple vehicle platforms in a database that correspond to the insured item.

4. The rich media method of claim 3 where the severity of a damaged area is represented by a plurality of visual elements associated with a level of damage or an indication of a severity of loss.

5. The rich media method of claim 4 further comprising generating an email document when a reporting session is stored and transmitting the email document to the user.

6. The rich media method of claim 4 further comprising illustrating events that lead to the damage and illustrating events that occurred after the damage to the insured item in three dimensions.

7. The rich media method of claim 4 further comprising illustrating events that lead to the damage and events that occurred after the damage to the insured item in four dimensions.

8. The rich media method of claim 7 further comprising providing on-line access to an incident animator tool that is used to illustrate the events that lead to the damage and the events that occurred after the damage through a Web page that provides controls for receiving information automatically.

9. The rich media method of claim 8 where the relative and absolute data are received directly from a vehicle.

10. The rich media method of claim 8 further comprising gathering content-related information related to the events that lead to the damage and the events that occurred after the damage automatically by searching through publicly accessible distributed networks.

11. The rich media method of claim of claim 10 further comprising receiving a request to meet with a representative on a specific day at a specified time.

12. The rich media method of claim 11 further comprising generating an email document and transmitting the email document to the user, the email document including a hyperlink configured such that selection by the user causes information sufficient to identify the user and the requested meeting day to be transmitted to the server.

13. The rich media method of claim 7 further comprising providing an interactive utility that guides the user through each step of an events recreation.

14. The rich media method of claim 1 further comprising transmitting the indicia to the remote computer to render a modified image of the insured item at the remote computer that indicates a damaged area of the insured item.

15. The rich media method of claim 1 where the linked element is overlaid onto or included within the image.

16. The rich media method of claim 1 further comprising generating a menu or toolbar for display at the remote computer that allows the user to select a severity level associated with the damaged area in response to the user selecting the linked element of the image.

17. The rich media method of claim 1 where the act of receiving the relative or absolute data comprises receiving the relative or absolute data by the server.

18. The rich media method of claim 1 where the act of assigning the indicia comprises assigning the indicia by the server.

19. The rich media method of claim 1 where the act of accessing the rich media application comprises accessing the rich media application by the server.

20. The rich media method of claim 1, where the graphical user interface comprises a drag-and-drop interface that includes an incident animator image of the insured item, and where the incident animator image is moveable around the drag-and-drop interface in response to a corresponding movement received from an input device.

21. The rich media method of claim 20, further comprising:
    collecting data through the drag-and-drop interface that indicates a relative position of the insured item before impact of the event that resulted in the damaged area of the insured item; and
    collecting data through the drag-and-drop interface that indicates a relative position of the insured item at impact of the event that resulted in the damaged area of the insured item.

22. The rich media method of claim 1, where the image comprises a vehicle windshield image, the method further comprising:

transmitting data to the remote computer that renders a graphical user interface at the remote computer that enables the user to interact with the vehicle windshield image to illustrate damage to a windshield of the insured item.

23. A rich media system that allows an insured to illustrate damage and request payment in accordance with an insurance policy comprising:
an interface configured to receive identification data from a remote computer that identifies a user and an insured item;
a server configured to allow access to a rich media application that generates dynamic objects that are transmitted to the remote computer to render an image of the insured item or a portion thereof;
the interface configured to receive relative or absolute data from the remote computer in response to the user selecting a linked element of the image of the insured item or the portion thereof to identify a damaged area of the insured item;
the server hosting a program that assigns an indicia to the damaged area of the insured item that corresponds to the relative data or the absolute data;
the server configured to transmit data to the remote computer that renders a graphical user interface at the remote computer that enables the user to visually recreate an event that resulted in the damaged area of the insured item; and
a database for storing data that identifies the damage to the insured item in a server programmed to receive insurance claims in accordance with an insurance policy.

24. The rich media system of claim 23, where the graphical user interface comprises a drag-and-drop interface that includes an incident animator image of the insured item, and where the incident animator image is moveable around the drag-and-drop interface in response to a corresponding movement received from an input device;
where the server is configured to collect data through the drag-and-drop interface that indicates a relative position of the insured item before impact of the event that resulted in the damaged area of the insured item; and
where the server is configured to collect data through the drag-and-drop interface that indicates a relative position of the insured item at impact of the event that resulted in the damaged area of the insured item.

25. A rich media system that allows an insured to illustrate damage and request payment in accordance with an insurance policy or another formal arrangement comprising:
a plurality of network servers that operate and appear to clients as if the network of servers comprise a single computer;
a damage indicator tool resident to one of the plurality of network servers that enables a remote user to visually illustrate damage to an item through a first rich media application that supports a relative pointing device and an absolute pointing device;
an incident animator tool linked to the damage indicator tool and resident to one of the plurality of network servers that enables the remote user to visually recreate an event in a second rich media application that resulted in the damage to the item; and
a scheduler linked to the incident animator tool and the damage indicator tool and resident to one of the plurality of network servers that enables the remote user to schedule an appointment for an inspection or repair of the illustrated damage to the item through a remote web browser.

26. The rich media system of claim 25 further comprising a wireless interface configured to receive data directly from a vehicle computer that captures vehicle sensor outputs that track vehicle characteristics.

27. The rich media system of claim 25 where the scheduler is configured to wirelessly transmit a destination to a user's navigation system.

28. The rich media system of claim 25 further comprising a windshield damage indicator resident to one of the plurality of network servers that enables the remote user to illustrate damage to a windshield.

29. The rich media system of claim 28 where the windshield damage indicator is configured to automatically identify the remote user's windshield when the remote user logs onto one of the network servers.

30. The rich media system of claim 29 further comprising an inference engine that automatically determines if a windshield should be replaced or repaired.

31. The rich media system of claim 25 where the incident animator tool is configured to transmit data to the remote web browser that renders a drag-and-drop graphical user interface that enables the remote user to visually recreate the event that resulted in the damage to the item, where the drag-and-drop graphical user interface comprises an image of the item, and where the incident animator tool is configured to move the image of the item within the drag-and-drop graphical user interface in response to a corresponding movement input from the relative pointing device or the absolute pointing device.

32. The rich media system of claim 31 where the incident animator tool is configured to move the image of the item within the drag-and-drop graphical user interface, in response to a corresponding movement input from the absolute pointing device or the relative pointing device, to a first position that represents a relative position of the item before impact of the event that resulted in the damage to the item; and
where the incident animator tool is configured to move the image of the item within the drag-and-drop graphical user interface, in response to a corresponding movement input from the absolute pointing device or the relative pointing device, to a second position that represents a relative position of the item at impact of the event that resulted in the damage to the item.

33. The rich media system of claim 32 where the incident animator tool is configured to use the first position and the second position to generate a tweened animation that represents an animated recreation of the event that resulted in the damage to the item.

34. A rich media damage illustration system, comprising:
an interface configured to receive identification data from a remote computer that identifies an insured item;
a server configured to allow access to a rich media application that generates dynamic objects that are transmitted to the remote computer to render an image of the insured item or a portion thereof at the remote computer;
the interface configured to receive damage data from the remote computer in response to a user of the remote computer selecting an element of the image of the insured item or the portion thereof displayed at the remote computer to identify a damaged area of the insured item;
the server hosting a program that assigns an indicia to the damaged area that corresponds to the damage data received from the remote computer;

the server configured to transmit the indicia to the remote computer to render a modified image of the insured item at the remote computer that indicates the damaged area of the insured item;

the server configured to transmit data to the remote computer that renders a graphical user interface at the remote computer that enables the user to visually recreate an event that resulted in the damaged area of the insured item; and a database for storing data that identifies damage to the insured item in a server programmed to receive insurance claims in accordance with an insurance policy.

35. The rich media damage illustration system of claim 34, where the graphical user interface comprises a drag-and-drop interface that includes an incident animator image of the insured item, and where the incident animator image is moveable around the drag-and-drop interface in response to a corresponding movement received from an input device;

where the server is configured to collect data through the drag-and-drop interface that indicates a relative position of the insured item before impact of the event that resulted in the damaged area of the insured item; and where the server is configured to collect data through the drag-and-drop graphical user interface that indicates a relative position of the insured item at impact of the event that resulted in the damaged area of the insured item.

36. A rich media method for illustrating windshield damage, comprising:

accessing a rich media application that generates dynamic objects that are transmitted to a remote computer to render an image of a vehicle windshield;

transmitting data by a server computer to the remote computer that renders a graphical user interface at the remote computer that enables a user to interact with the image to illustrate damage to the vehicle windshield;

receiving data by the server computer from the remote computer in response to the user selecting a linked element of the image of the vehicle windshield to identify a damaged area of the vehicle windshield; and storing data that identifies the damaged area in a server programmed to receive insurance claims in accordance with an insurance policy.

37. The rich media method of claim 36, where the graphical user interface comprises one or more input elements that enable the user to move, scale, or rotate a windshield damage image that is displayed with the image of the vehicle windshield in the graphical user interface.

38. The rich media method of claim 36, where the graphical user interface comprises one or more input elements that enable the user to move, scale, and rotate a windshield damage image that is displayed with the image of the vehicle windshield in the graphical user interface.

39. The rich media method of claim 36, where the graphical user interface comprises a plurality of selectable windshield damage type images that are configured to be added to the image of the vehicle windshield in the graphical user interface in response to selection by the user.

40. The rich media method of claim 39, where the plurality of selectable windshield damage type images comprises a non-branching crack image, a branching crack image, and a hole image.

* * * * *

UNITED STATES PATENT AND TRADEMARK OFFICE
CERTIFICATE OF CORRECTION

PATENT NO. : 8,095,394 B2  
APPLICATION NO. : 11/803932  
DATED : January 10, 2012  
INVENTOR(S) : Vikki Nowak et al.

Page 1 of 1

It is certified that error appears in the above-identified patent and that said Letters Patent is hereby corrected as shown below:

On the title page in item (75), the spelling of the name of the second listed inventor is changed from "Brian Brylinksi" to "Brian Brylinski".

Signed and Sealed this
Seventh Day of August, 2012

David J. Kappos
*Director of the United States Patent and Trademark Office*